US011941962B2

(12) United States Patent
Ludington

(10) Patent No.: US 11,941,962 B2
(45) Date of Patent: Mar. 26, 2024

(54) MAILBOX NOTIFICATION SYSTEM AND METHOD OF USE

(71) Applicant: Mark Donald Ludington, Madison, MS (US)

(72) Inventor: Mark Donald Ludington, Madison, MS (US)

( * ) Notice: Subject to any disclaimer, the term of this patent is extended or adjusted under 35 U.S.C. 154(b) by 0 days.

(21) Appl. No.: 17/936,568

(22) Filed: Sep. 29, 2022

(65) Prior Publication Data

US 2023/0080864 A1 Mar. 16, 2023

Related U.S. Application Data

(60) Provisional application No. 63/233,620, filed on Aug. 16, 2021.

(51) Int. Cl.
*G08B 13/19* (2006.01)
*G08B 25/00* (2006.01)
*G08B 25/10* (2006.01)

(52) U.S. Cl.
CPC ........... *G08B 13/19* (2013.01); *G08B 25/001* (2013.01); *G08B 25/10* (2013.01)

(58) Field of Classification Search
CPC ...... G08B 13/19; G08B 25/001; G08B 25/10; A47G 29/1214
See application file for complete search history.

(56) References Cited

U.S. PATENT DOCUMENTS

| | | | |
|---|---|---|---|
| 4,262,839 A | 4/1981 | Wisniewski | |
| 4,868,543 A | 9/1989 | Binkley | |
| 4,978,057 A | 12/1990 | Roden | |
| 5,092,517 A | 3/1992 | Jeffries, Jr. et al. | |
| 5,239,305 A | 8/1993 | Murphy et al. | |
| 5,377,906 A | 1/1995 | Mason | |
| 5,440,294 A | 8/1995 | Mercier et al. | |
| 5,664,728 A | 9/1997 | Jones | |
| 6,114,959 A | 9/2000 | Bennett | |
| 6,459,375 B1 | 10/2002 | Wallace | |
| 6,995,671 B2 | 2/2006 | Dutta et al. | |
| 7,025,249 B1 | 4/2006 | Ledbetter | |
| 7,061,377 B1 | 6/2006 | Kraus | |
| 7,187,285 B2 | 3/2007 | Staples | |
| 7,486,948 B1 * | 2/2009 | Vergon | A47G 29/1214 455/412.2 |
| 7,786,862 B1 | 8/2010 | Campbell | |
| 9,565,961 B1 | 2/2017 | Kirschner, Sr. | |
| 9,609,972 B1 | 4/2017 | DuBois | |
| 9,913,555 B2 | 3/2018 | Galluzzi | |
| 10,016,083 B1 | 7/2018 | Atieh | |
| 10,028,111 B2 | 7/2018 | Ansari | |
| 10,297,133 B2 | 5/2019 | Waclawik et al. | |
| 10,497,192 B2 | 12/2019 | Amuduri | |

(Continued)

*Primary Examiner* — Hoi C Lau

(74) *Attorney, Agent, or Firm* — Dunlap Bennett & Ludwig, PLLC

(57) ABSTRACT

A mailbox notification system includes a radio frequency transmitter attached to a mailbox configured to transmit a signal upon detection of motion by a motion sensor, the motion sensor in electronic communication with the transmitter and configured to detect motion of a mailbox door, and a radio frequency receiver in electronic communication with the transmitter via a radio frequency wherein the receiver is configured to alert a user upon receiving a transmission from the transmitter.

5 Claims, 2 Drawing Sheets

(56) References Cited

U.S. PATENT DOCUMENTS

| | | | | |
|---|---|---|---|---|
| 10,909,496 | B2 | 2/2021 | Lundahl | |
| 10,986,950 | B2 | 4/2021 | Van Valkenburg, III | |
| 2002/0024438 | A1 | 2/2002 | Roberson | |
| 2003/0085631 | A1 | 5/2003 | Cech et al. | |
| 2004/0140895 | A1 | 7/2004 | Jordan | |
| 2004/0212502 | A1 | 10/2004 | Dalgaard | |
| 2005/0154602 | A1 * | 7/2005 | Hertz | A47G 29/30 705/339 |
| 2006/0144918 | A1 | 7/2006 | Hutchinson | |
| 2008/0040243 | A1 | 2/2008 | Chang et al. | |
| 2011/0234402 | A1 | 9/2011 | Byrne | |
| 2015/0016665 | A1 * | 1/2015 | Tanner | G08B 13/1436 382/101 |
| 2016/0278558 | A1 * | 9/2016 | Ansari | A47G 29/121 |
| 2016/0353911 | A1 | 12/2016 | Ziemianski et al. | |
| 2017/0295979 | A1 | 10/2017 | Appell | |
| 2018/0008076 | A1 | 1/2018 | Mitra et al. | |
| 2018/0012476 | A1 | 1/2018 | Haynes | |
| 2018/0206661 | A1 | 7/2018 | Zhang et al. | |
| 2018/0374332 | A1 * | 12/2018 | Waclawik | A47G 29/1209 |
| 2021/0059454 | A1 | 3/2021 | Luke | |

* cited by examiner

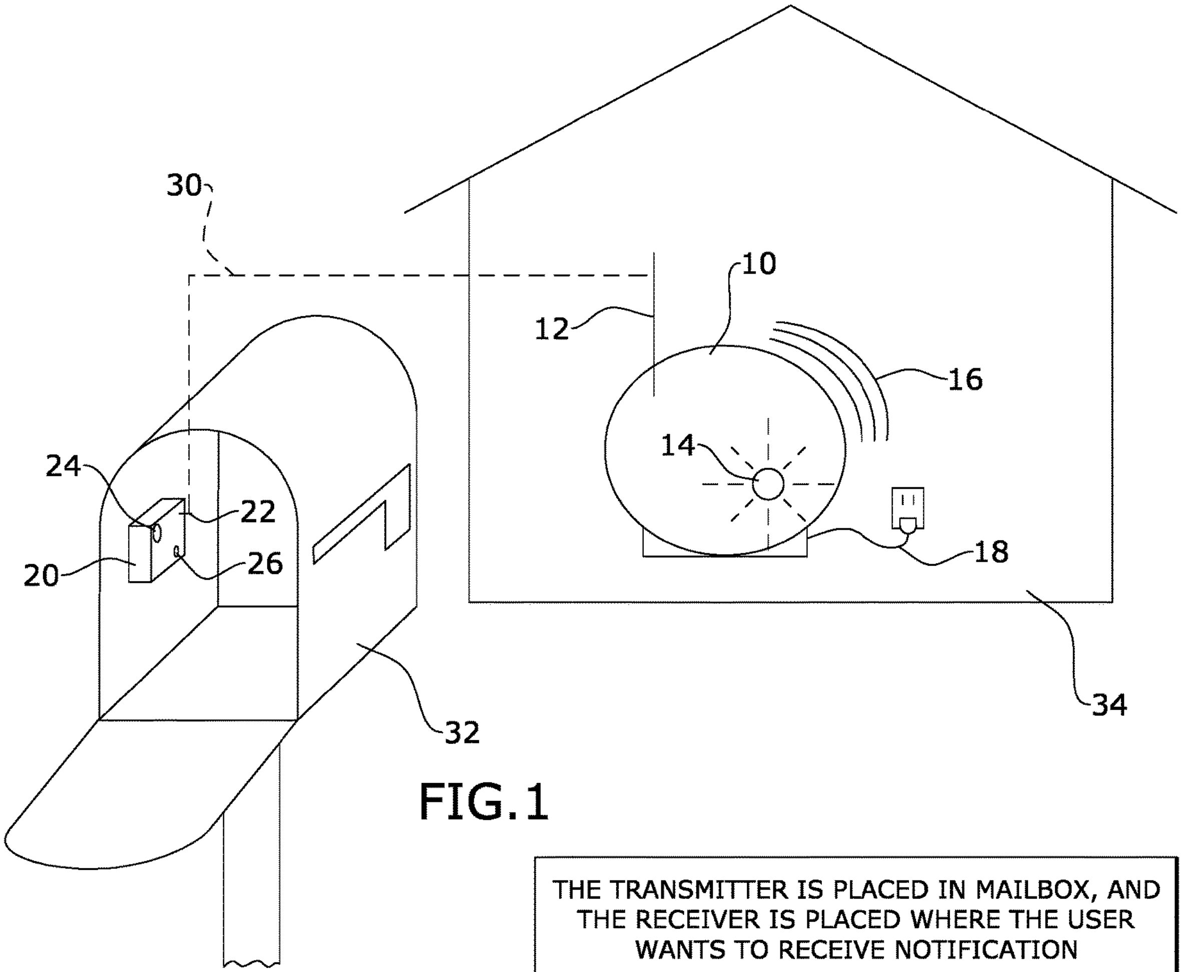

FIG.1

THE TRANSMITTER IS PLACED IN MAILBOX, AND THE RECEIVER IS PLACED WHERE THE USER WANTS TO RECEIVE NOTIFICATION

↓

WHEN THE MAILBOX DOOR IS OPENED, THE TRANSMITTER SENDS A SIGNAL TO THE RECEIVER

↓

THE RECEIVER FLASHES LED LIGHT AND BUZZES TO ALERT THE USER. THE USER CAN HIT RESET ON THE RECEIVER TO CANCEL THE NOTIFICATION IF THEY DON'T WANT TO CHECK THE MAIL AT THAT TIME.

↓

THE USER CHECKS THE MAILBOX AND HITS THE RESET ON THE TRANSMITTER TO CANCEL NOTIFICATION

FIG.2

MAILBOX NOTIFICATION SYSTEM AND METHOD OF USE

CROSS-REFERENCE TO RELATED APPLICATION

This application claims the benefit of priority of U.S. provisional application No. 63/233,620, filed Aug. 16, 2021, the contents of which are herein incorporated by reference.

BACKGROUND OF THE INVENTION

The present invention relates to mailboxes and, more particularly, to a mailbox notification system and method therefor.

Presently, there are limited devices that alert a user when mail has arrived at their mailbox. While some mailboxes have a flag or an indicator to alert a user when someone has put mail in the mailbox, flags or indicators cannot be seen by users who live a distance away from their mailbox. This is particularly common in rural areas or for those who live in apartments.

Some applications connect to smartphones to alert users or at a minimum require internet service. However, elderly users do not have smartphones or are not familiar with smartphones. Some users do not even have internet service or access. Frequently, these devices are very limited in their range and often rely on a short radio frequency.

As can be seen, there is a need for a mailbox notification system that notifies a user when there is mail.

SUMMARY OF THE INVENTION

In one aspect of the present invention, a mailbox notification system comprises a radio frequency transmitter attached to a mailbox configured to transmit a signal upon detection of motion by a motion sensor, the motion sensor in electronic communication with the transmitter and configured to detect motion of a mailbox door, and a radio frequency receiver in electronic communication with the transmitter via a radio frequency wherein the receiver is configured to alert a user upon receiving a transmission from the transmitter.

Advantages of the present invention include notification when mail has arrived, knowledge when mail has not yet arrived including knowledge of whether there is time to place outgoing mail, and notification when mail has been picked up.

Advantageously, the present invention does not require cell service or internet service.

These and other features, aspects and advantages of the present invention will become better understood with reference to the following drawings, description, and claims.

BRIEF DESCRIPTION OF THE DRAWINGS

FIG. 1 is a schematic view of a transmitter in a mailbox in communication with a receiver according to an embodiment of the present invention;

FIG. 2 is a flow chart of method steps according to an embodiment of the present invention;

DETAILED DESCRIPTION OF THE INVENTION

Figure 3:
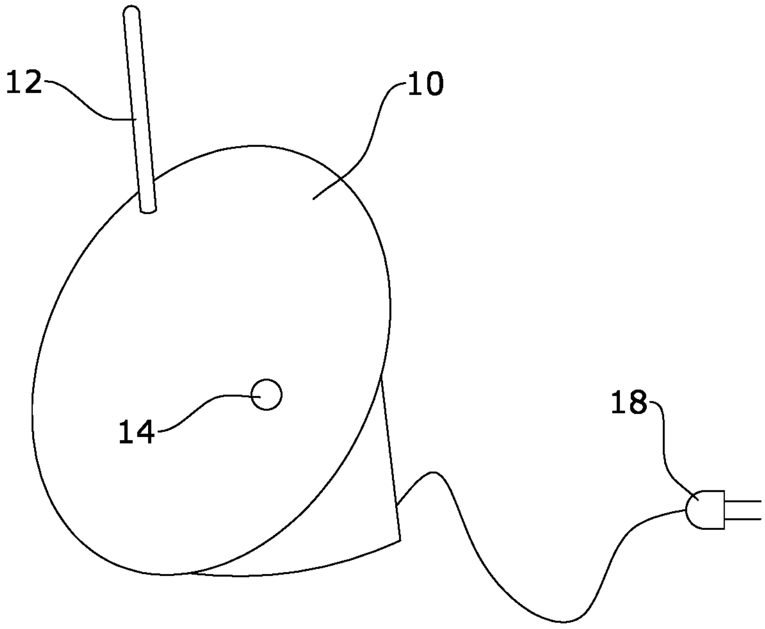
FIG. 3 is a schematic view of a receiver thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims with reference to the drawings.

A general overview of the various features of the invention will be provided, with a detailed description following. Broadly, an embodiment of the present invention provides a device that notifies a user when a mailbox or mailbox door has been opened. The present invention monitors and detects motion data and transmits the data to a receiver when the motion data reaches a specified value.

The present invention utilizes wireless connectivity modules, such as XBee™ devices, and technology for transmitting/receiving data. In some embodiments, the present invention may have a range of up to approximately two miles. The radio frequency modules may be a radio frequency receiver and a radio frequency transmitter in electronic communication via a radio frequency.

A motion detector may detect mailbox activity such as when a mailbox or mailbox door is opened. The motion detector may be mounted to an interior of the mailbox. For example, the present invention may utilize XBee™ technology such as the XBee 3™ or XBee 3Pro™. A micro controller, such as an ATMega 328P™, may monitor the motion sensor and transmit data to a receiver according to the motion sensor data. It may transmit to a specified media access control (MAC) address. The motion sensor may send a signal to the transmitter upon motion being detected.

The transmitter may be battery powered or wired. The battery may attach to an inside of the mailbox. For example, it may attach magnetically. When motion is detected, the device transmits data wirelessly (in some embodiments using radio frequency with a range of 1,000 yards to 2 miles). A motion detector, a configured to a wireless connectivity module, and a microcontroller may be populated on a circuit board of the transmitter. The circuit board may be mounted in or housed in a container. The container may be plastic.

The receiver may be battery powered or powered from a standard electrical wall outlet. The receiver may utilize an XBee™ device for receiving data wirelessly from transmitter.

The receiver may notify the user when a transmission is received such as when the mailbox has been opened. The receiver may notify the user by a flashing light, such as a light emitting diode (LED), or by a sound such as a ringer or a buzzer. The receiver may activate upon receipt of a transmission from the transmitter.

The user may press a reset button to reset the notification.

Some embodiments of the present invention include two self-contained embedded devices. A connection to any other device (computer or smart phone) is not necessary.

The present invention may utilize two-way communication which enables a system notification to be reset from either the receiver or the transmitter, i.e. the system may be reset from the mail box. The system provides long range services.

The motion detector may utilize infrared technology for complete darkness. Each system (a receiver and a transmitter, may be configured to a unique network address enabling multiple systems to operate in close proximity to each other.

Referring now to the Figures, FIG. 1 is a schematic representation according to an embodiment of the present invention. A receiver 10 is in electronic communication with a transmitter 20 via a signal 30. The transmitter 20 is coupled with a mailbox 32. The transmitter comprises a transmitter antenna 22, a motion sensor 24, and a transmitter indicator light 26 to alert a user of functionality or power. The transmitter 20 may further comprise a reset button or a power switch. Upon detecting motion with the motion sensor 24, such as an opening/closing of the mailbox 32, the transmitter 20 sends a signal 30 to the receiver 10. The receiver comprises a receiver antenna 12, a power supply 18, and a receiver indicator light 14 to alert a user. The receiver 10 may further comprise a reset button or a power switch. Upon receiving a signal 30, the receiver 10 may alert a user via the receiver indicator light 14 or a sound 16.

FIG. 2 details method steps according to an embodiment of the present invention. The transmitter 20 is placed inside of a mailbox 32. When the mailbox 32 door is opened, the transmitter 20 sends a signal 30 to the receiver 10. The receiver indicator light 14 flashes and a sound 16 is emitted to alert a user. The user may reset a notification on the receiver 10. The user may then check the mailbox 32. The user may also reset the transmitter 20 manually by a button on the transmitter 20.

FIG. 3 is a schematic view of the receiver 10.

Figure 4:
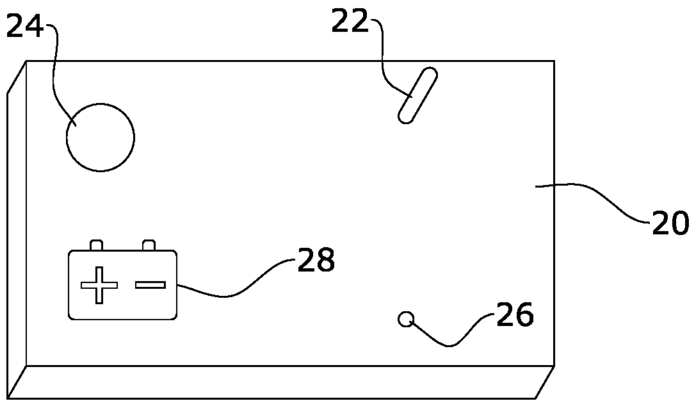
FIG. 4 is a schematic view of a transmitter thereof.

FIG. 4 is a schematic view of the transmitter 20. A power source 28 attached to the receiver 10.

It should be understood, of course, that the foregoing relates to exemplary embodiments of the invention and that modifications may be made without departing from the spirit and scope of the invention as set forth in the following claims.

What is claimed is:

1. A mailbox notification system comprising:

a radio frequency transmitter attached to a mailbox configured to transmit a signal upon detection of motion by a motion sensor;

the motion sensor in electronic communication with the transmitter and configured to detect motion of a mailbox door; and a radio frequency receiver in electronic communication with the transmitter via a radio frequency wherein the receiver is configured to alert a user upon receiving a transmission from the transmitter, wherein the radio frequency signal transmits to a specified media access control (MAC) address.

2. The mailbox notification system of claim 1, wherein the transmitter is affixed to an interior of the mailbox.

3. The mailbox notification system of claim 1, wherein the user may reset the system from the receiver and/or the transmitter.

4. The mailbox notification system of claim 1, wherein the motion sensor utilizes infrared.

5. A method of notifying a user of mailbox activity comprising:

providing the mailbox notification system of claim 1;

detecting motion of a mailbox door by the motion sensor;

transmitting a signal by a transmitter to a receiver; and alerting a user upon receipt of the signal.

* * * * *